US012381485B2

(12) United States Patent
Hsu et al.

(10) Patent No.: US 12,381,485 B2
(45) Date of Patent: Aug. 5, 2025

(54) GROUND REFERENCE GENERATOR FOR POWER CONVERTER

(71) Applicant: Texas Instruments Incorporated, Dallas, TX (US)

(72) Inventors: Ting-Li Hsu, Aachen (DE); Stefan Herzer, Marzling (DE); Qiao Yang, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 233 days.

(21) Appl. No.: 18/211,788

(22) Filed: Jun. 20, 2023

(65) Prior Publication Data

US 2024/0429819 A1 Dec. 26, 2024

(51) Int. Cl.
*H02M 3/158* (2006.01)
*H02M 1/088* (2006.01)

(52) U.S. Cl.
CPC ........... *H02M 3/158* (2013.01); *H02M 1/088* (2013.01)

(58) Field of Classification Search
CPC .............................. H02M 3/158; H02M 1/088
See application file for complete search history.

(56) References Cited

U.S. PATENT DOCUMENTS

| | | | |
|---|---|---|---|
| 2011/0037448 A1* | 2/2011 | Liu | H02M 3/158 323/284 |
| 2017/0324323 A1* | 11/2017 | Liu | H02M 1/08 |
| 2019/0017798 A1* | 1/2019 | Lin | G06F 3/03545 |
| 2020/0144915 A1* | 5/2020 | Mei | H02M 1/32 |
| 2021/0091668 A1* | 3/2021 | Buhari | H02M 1/08 |

* cited by examiner

*Primary Examiner* — Rafael O De Leon Domenech
(74) *Attorney, Agent, or Firm* — Valerie M. Davis; Frank D. Cimino (57) ABSTRACT

A ground reference circuit to generate a ground reference for a voltage reference circuit includes a resistor coupled in series with a transistor via a current mirror. The resistor is coupled between a ground reference terminal of the voltage reference circuit and a ground terminal of a power converter. The transistor control terminal is configured to receive a pulse width modulation (PWM) control signal having a duty cycle similar to a switching element duty cycle of the power converter. The current mirror circuit is coupled between a current terminal of the transistor and the ground reference terminal. A controller configured to control the switching element duty cycle may include the ground reference circuit, along with the voltage reference circuit, and a PWM circuit configured to determine the switching element duty cycle based on a comparison between a reference voltage provided by the voltage reference circuit and the converter output voltage.

20 Claims, 4 Drawing Sheets

GROUND REFERENCE GENERATOR FOR POWER CONVERTER

TECHNICAL FIELD

This description relates to power converters, and more particularly, to providing a stable ground reference in a power converter.

BACKGROUND

Power converters (such as DC-DC converters) are widely used in electronic systems such as consumer electronics, automotive systems, industrial equipment, lighting systems, etc. for converting an input voltage to an output voltage higher or lower than the input voltage. Such converters utilize a metal oxide semiconductor field effect transistor (MOSFET) as a power switch that turns on and off to regulate the output voltage. A feedback loop along with a controller is also used to determine the on or off time of the transistor in each switching cycle based on the feedback voltage representative of the power converter output voltage, and a reference voltage, thereby regulating the output voltage of the power converter. A voltage reference circuit provides the reference voltage to the controller.

SUMMARY

According to an embodiment, a ground reference circuit includes a resistor having first and second resistor terminals, a first transistor having first and second terminals and a control terminal, a second transistor having first and second terminals and a control terminal, a third transistor having first and second terminals and a control terminal, and a fourth transistor having first and second terminals and a control terminal. The first resistor terminal is coupled to a reference terminal, and the second resistor terminal is coupled to a ground terminal. The second terminal of the first transistor is coupled to the ground terminal, and the control terminal of the first transistor is coupled to a first control signal terminal. The first terminal of the second transistor is coupled to the first terminal of the first transistor, and the control terminal of the second transistor is coupled to a second control signal terminal. The first terminal of the third transistor is coupled to both the control terminal of the third transistor and the second terminal of the second transistor, and the second terminal of the third transistor is coupled to the reference terminal. The first terminal of the fourth transistor is coupled to a power supply terminal, the second terminal of the fourth transistor is coupled to the reference terminal, and the control terminal of the fourth transistor is coupled to the control terminal of the third transistor.

According to another embodiment, controller is described that is configured to control a switching element duty cycle for a power converter circuit. The controller includes a voltage reference circuit configured to generate a reference voltage and having a ground reference terminal and an output terminal, a pulse width modulation circuit configured to determine the switching element duty cycle based on a comparison between the reference voltage and a feedback voltage representative of an output voltage of the power converter circuit, and a ground reference circuit configured to generate a ground reference for the voltage reference circuit. The ground reference circuit includes a resistor coupled between the ground reference terminal of the voltage reference circuit and a ground terminal of the power converter circuit, a transistor having a first terminal, a second terminal, and a control terminal, with the control terminal configured to receive a pulse width modulation (PWM) control signal having the switching element duty cycle, and a current mirror circuit coupled between the second terminal of the transistor and the ground reference terminal of the voltage reference circuit.

According to another embodiment, a voltage regulator includes a first rail terminal, a second rail terminal, a ground rail terminal, a feedback circuit configured to provide a feedback voltage representative of an output voltage of the voltage regulator, a first transistor coupled between the first rail terminal and the ground rail terminal, a first driver coupled to a control terminal of the first transistor and configured to receive a voltage on the second voltage rail terminal, a second transistor coupled between the first transistor and the ground rail terminal, such that the first transistor and second transistor are serially connected between the first rail terminal and the ground rail terminal, a second driver coupled to a control terminal of the second transistor, a reference generator circuit having a ground terminal and configured to generate a reference voltage, a pulse width modulation circuit configured to determine a duty cycle of the second transistor based on a comparison between the feedback signal and the reference voltage, and a ground reference circuit configured to provide a ground reference to the ground terminal of the reference generator circuit.

DETAILED DESCRIPTION

A ground reference system is described. In an example, the system is configured to provide a ground reference for a voltage reference circuit in a power converter (e.g., a DC-DC buck converter). The ground reference system may include a ground reference circuit within a controller that generates the pulse width modulation (PWM) signals used to turn on and off one or more switching elements of the power converter, such as high-side and low-side switching elements of a buck converter. In such an example case, the high and low-side switching elements regulate whether an output switching terminal is coupled to an input power rail or a ground rail, and their respective on times dictate the output voltage level of the power converter. The high and low-side switching elements are alternately activated such that the high-side switching element is on while the low-side switching element is off and vice versa. A feedback loop is provided to sample the power converter output voltage and provide it back to the controller to be compared against a reference voltage. Based on the comparison, the controller sets the appropriate on time for the high-side switching element to bring the output voltage to a desired voltage level. The ground reference circuit may use one or more control signals from within the controller to provide a ground reference for the voltage reference circuit (e.g., bandgap voltage reference), which generates the aforementioned reference voltage. For example, a sample current that is proportional to the output current of the power converter is passed through a current mirror and filter arrangement in phase with the PWM control signal that activates the low-side switching element. The current mirror amplifies the sample current to provide a magnified current across a resistor to provide a dedicated ground reference to the voltage reference circuit. This dedicated ground reference is less impacted by parasitic currents, relative to the global system ground. The voltage reference circuit uses the more stable dedicated ground reference in place of the global system ground when providing the reference voltage. According to some embodiments, the potential at the dedicated ground reference terminal changes depending on the current output of the power converter and the duty cycle of the switching elements of the power converter.

General Overview

As described above, a voltage reference circuit can be used to provide a reference voltage to the controller, which in turn controls one or more switching elements of a given power converter, to provide a regulated output voltage. For example, a bandgap voltage reference circuit can be used by the controller of the power converter to provide a reference voltage for comparison with the feedback voltage collected from the output of the power converter. However, when current flows through the low-side switch and the output voltage begins to decrease, a parasitic IR drop may be formed between an internal ground reference used by the bandgap voltage reference circuit and the global chip ground terminal. This causes an unwanted shift of the potential on the internal ground reference, which in turn causes load regulation where the output voltage becomes affected by the size of the load attached to the power converter. This issue is also more prominent during lower duty cycle operation because the DC part of the parasitic IR drop is higher at lower duty cycles. The magnitude of the parasitic IR drop may also be affected by the type of package used for the power converter, as some leadframe packages with high resistance can make the load regulation worse at the output.

Thus, in accordance with some embodiments of the present disclosure, a ground reference system is provided, that may be integrated with the controller of a power converter to dynamically shift the ground reference used by the bandgap voltage reference circuit to compensate for parasitic current present on the internal ground reference terminal. The shift in the ground reference may be affected by the level of output current and duty cycle of the power converter. According to some embodiments, the ground reference system includes a ground reference circuit integrated with, or at least coupled with, the controller of the power converter. The ground reference circuit is designed to receive a sample current proportional to the output current and to amplify the sample current (e.g., using a current mirror) to provide an amplified current on a ground reference terminal. A resistor may be coupled between the ground reference terminal of the ground reference system and an internal ground terminal of the power converter, to provide a dedicated ground reference terminal for the bandgap voltage reference circuit. According to some embodiments, a transistor is used to control when the sample current is applied to the current mirror with a control gate of the transistor being coupled to the PWM control signal for the low-side switching element. Because the transistor will be switching the current on and off in phase with the low-side PWM control signal, one or more filters, such as resistor-capacitor (RC) low-pass filters, may be provided with the current mirror to remove the AC component of the current, or otherwise extract the DC component of the current.

Numerous other variations will be apparent based on the embodiments described herein.

Electronic System

Figure 1:
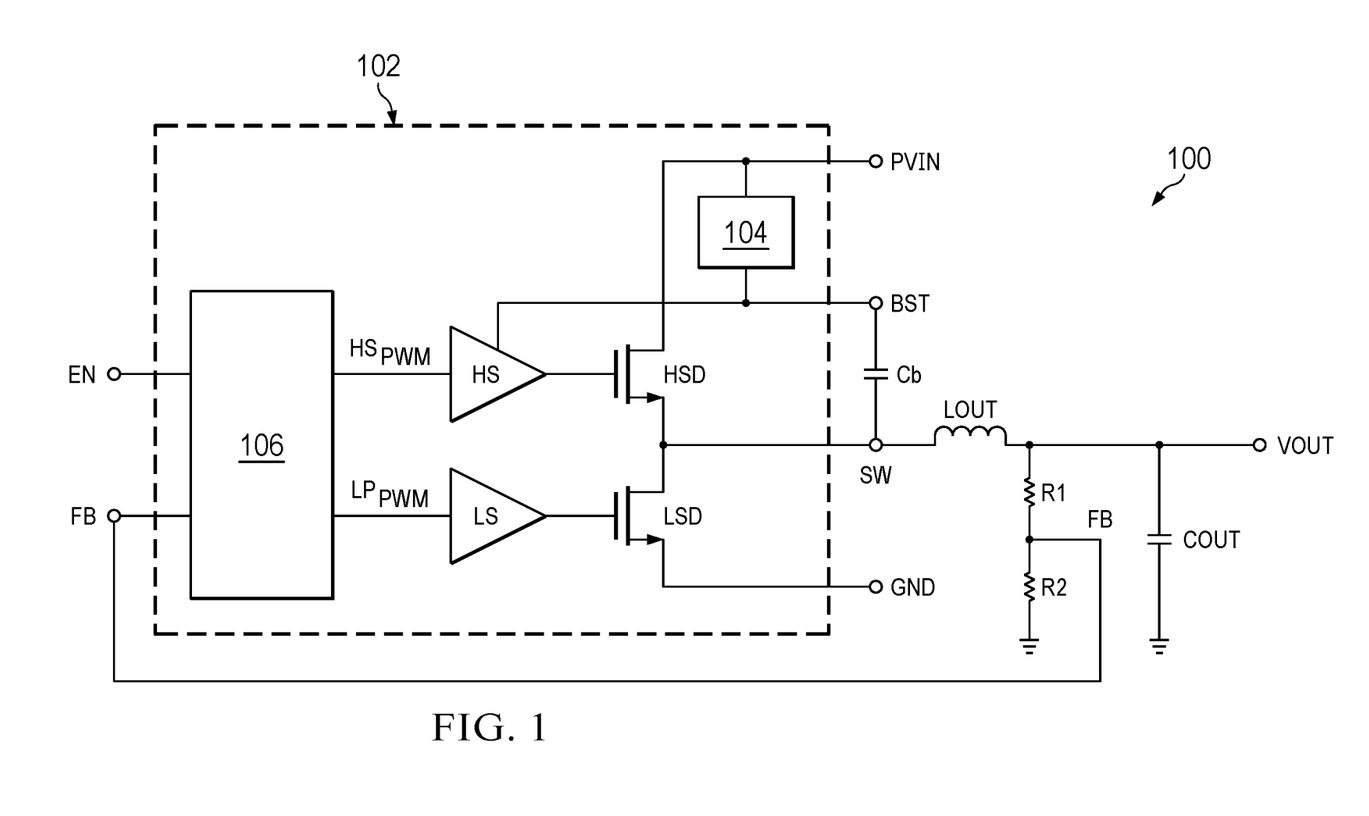
FIG. 1 is a block diagram of a voltage regulator, in an example.

FIG. 1 illustrates at least a portion of an example electronic system 100. In some cases, electronic system 100 is implemented as a system-on-chip, or as a chip set populated on a printed circuit board (PCB), or as a set of discrete components populated on a PCB, which may in turn be populated into a chassis of a multi-chassis system or an otherwise higher-level system, although any number of implementations can be used. Electronic system 100 may be part of a switching regulator or power converter, such as a DC-DC buck switching converter.

According to some embodiments, electronic system 100 includes a power converter circuit 102, which may be implemented as a chip within a chip package and may have various input/output (I/O) terminals, such as an enable terminal (EN), a power input terminal (PVIN), a bootstrap terminal (BST), a switching node terminal (SW), a ground terminal (GND), and a feedback terminal (FB). Any number of other I/O terminals may be provided.

According to some embodiments, power converter circuit 102 includes a high-side switching element (HSD) along with an associated high-side driver (HS) and a low-side switching element (LSD) along with an associated low-side driver (LS). As shown in FIG. 1, both high-side switching element HSD and low-side switching element LSD may be n-channel MOSFETs, although other suitable switching elements may be used. High-side switching element HSD has a first terminal coupled to an input power rail (e.g., PVIN terminal) and a second terminal coupled to the switching node SW of the power converter. Accordingly, the state of high-side driver HS controls the gate terminal of high-side switching element HSD and high-side switching element HSD provides the input voltage on PVIN to switching node SW when the high-side switching element HSD is on. Low-side switching element LSD has a first terminal coupled to the switching node SW and a second terminal coupled to a ground rail (e.g., at ground terminal GND). The ground terminal GND may be a global ground associated with the chip that includes power converter circuit 102. The state of low-side driver LS controls the gate terminal of low-side switching element LSD and low-side switching element LSD provides a ground voltage to switching node SW when the low-side switching element LSD is on. Only one of HSD and LSD can be on at any given time and LSD is off whenever HSD is on and vice versa.

A boost capacitor Cb may be coupled between the switching node SW and bootstrap terminal BST (or a bootstrap voltage rail) and can be used to provide a boosted voltage that is higher than the output switching voltage at SW in conjunction with a bootstrap charging circuit 104 (e.g., used to charge Cb) between bootstrap terminal BST and input voltage terminal PVIN. This boosted voltage may then be provided to the positive supply rail of the high-side driver HS.

An inductor LOUT may be provided at the switching node SW to smooth out the changing voltage and provide a more stable output voltage as VOUT. In some cases, inductor LOUT may be, for example, part of a transformer, or any other suitable energy storage element. A voltage divider that includes resistors R1 and R2 may be provided at the output to generate a feedback voltage that is fed to feedback terminal FB of power converter circuit 102.

A controller 106 provides control signals (e.g., HSPWM and LSPWM) to the inputs of high-side driver HS and low-side driver LS, respectively. These control signals may be pulse width modulated signals that drive the respective high-side and low-side switching elements. Controller 106 may also receive various inputs (e.g., feedback voltage FB) to facilitate the generation of the control signals.

Figure 2A:
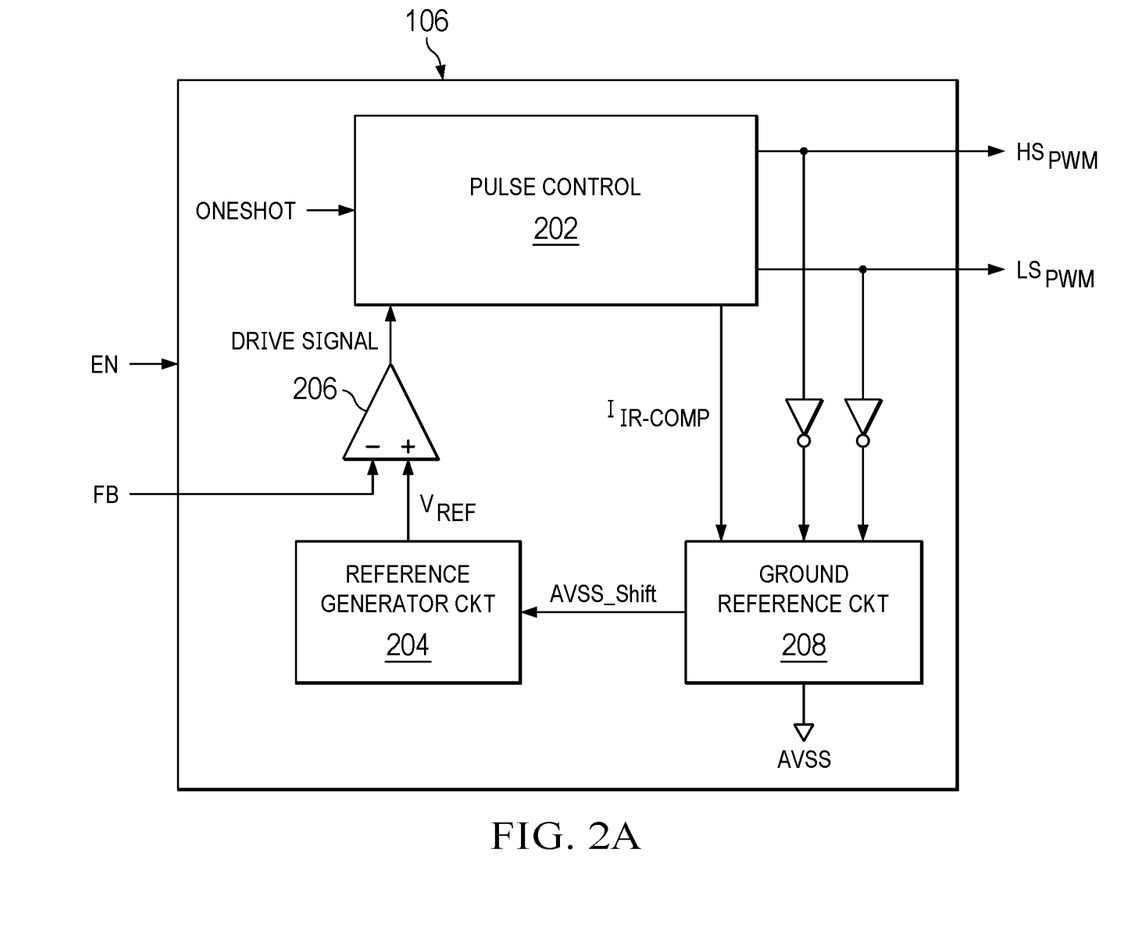
FIG. 2A is a block diagram showing a controller of the voltage regulator illustrated in FIG. 1, in an example.

FIG. 2A illustrates a diagram of controller 106, according to some embodiments. Controller 106 includes a pulse control block 202 that generates the PWM control signals for both the high-side and low-side drivers. Controller 106 also includes reference generator circuit 204 that generates a voltage reference $V_{REF}$ to be compared against a feedback voltage on feedback terminal FB. In some embodiments, reference generator circuit 204 includes a bandgap voltage reference circuit. A bandgap voltage reference circuit may refer to any circuit that attempts to generate a stable voltage reference independent of changes in temperature and supply voltage. Briefly, a bandgap voltage reference circuit typically includes a voltage reference generator, a temperature sensor, and a current source. The voltage reference generator produces a stable reference voltage, which may be based on a combination of bipolar junction transistors (BJTs) and diodes. The temperature sensor measures the temperature of the circuit and generates a compensating voltage that is added to the reference voltage to cancel out the temperature dependence of the circuit. The current source may be used to bias the BJTs and diodes in the voltage reference generator. Like most circuits, the bandgap voltage reference circuit relies upon a stable ground potential to function properly, as the output voltage reference from the bandgap voltage reference circuit is based on the potential difference between an output voltage reference terminal and a ground terminal of the bandgap voltage reference circuit.

Figure 2B:
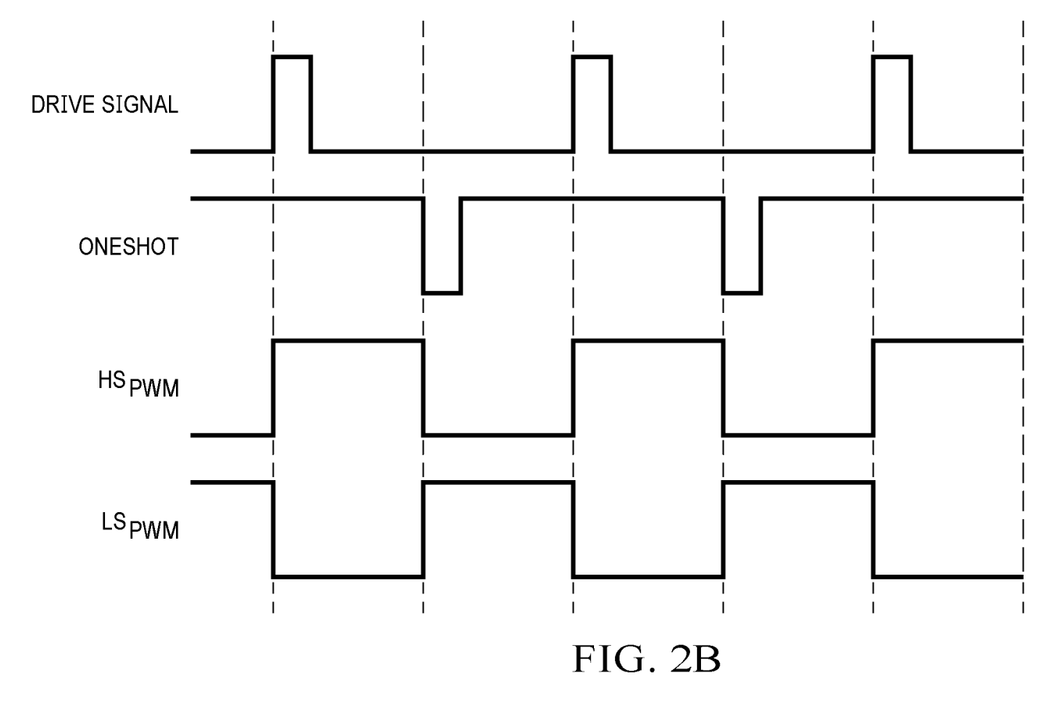
FIG. 2B is a timing diagram of various signals associated with a pulse control block of the controller illustrated in FIG. 2A, in an example.

Pulse control block 202 determines the on-time and duty cycle for the PWM control signals based at least in part on the state of a ONESHOT signal and a Drive Signal. FIG. 2B illustrates an example timing diagram illustrating how these signals are used to generate the PWM control signals. According to some embodiments, when the Drive Signal pulses HIGH, the HSPWM signal is asserted high to turn on the high-side switching element HSD. The HSPWM signal will remain HIGH until ONESHOT pulses LOW, at which point the HSPWM signal is asserted low to turn off the high-side switching element HSD. The HSPWM signal will remain LOW until the Drive Signal pulses HIGH again to repeat the cycle. Accordingly, the Drive Signal controls when the high-side switching element is turned on and ONESHOT determines the duty cycle by controlling how long HSPWM remains HIGH. The LSPWM signal is the inverse of the HSPWM signal to ensure correct switching operation of the high-side and low-side switching elements.

Returning to FIG. 2A, the state of Drive Signal is determined by comparing the feedback voltage at FB to a reference voltage ($V_{REF}$) at a comparator 206. Accordingly, Drive Signal will pulse HIGH when the feedback voltage falls below $V_{REF}$, thus turning the high-side switching element HSD back on. The reference voltage $V_{REF}$ is a stable potential value that is provided by reference generator circuit 204.

According to some embodiments, controller 106 also includes a ground reference circuit 208 that provides a ground reference AVSS_Shift to reference generator circuit 204. The potential on AVSS_Shift may be used by reference generator circuit 204 as a dedicated ground potential in place of the internal ground reference AVSS, according to some embodiments. Accordingly, ground reference circuit 208 provides the dedicated ground reference AVSS_Shift that is unaffected or substantially unaffected by parasitic current present on the internal ground reference AVSS. According to some embodiments, ground reference circuit 208 uses a sample current $I_{IR\text{-}comp}$ from pulse control block 202 along with the PWM control signals HSPWM and LSPWM to generate AVSS_Shift. Sample current $I_{IR\text{-}comp}$ may be proportional to (or substantially equal to) the current output at the switching node terminal SW of the power converter. According to some embodiments, the current output is compared by controller 106 to a reference current to determine the timing of the ONESHOT signal, which affects the duty cycle for the PWM control signals.

Ground Reference Circuit

Figure 3:
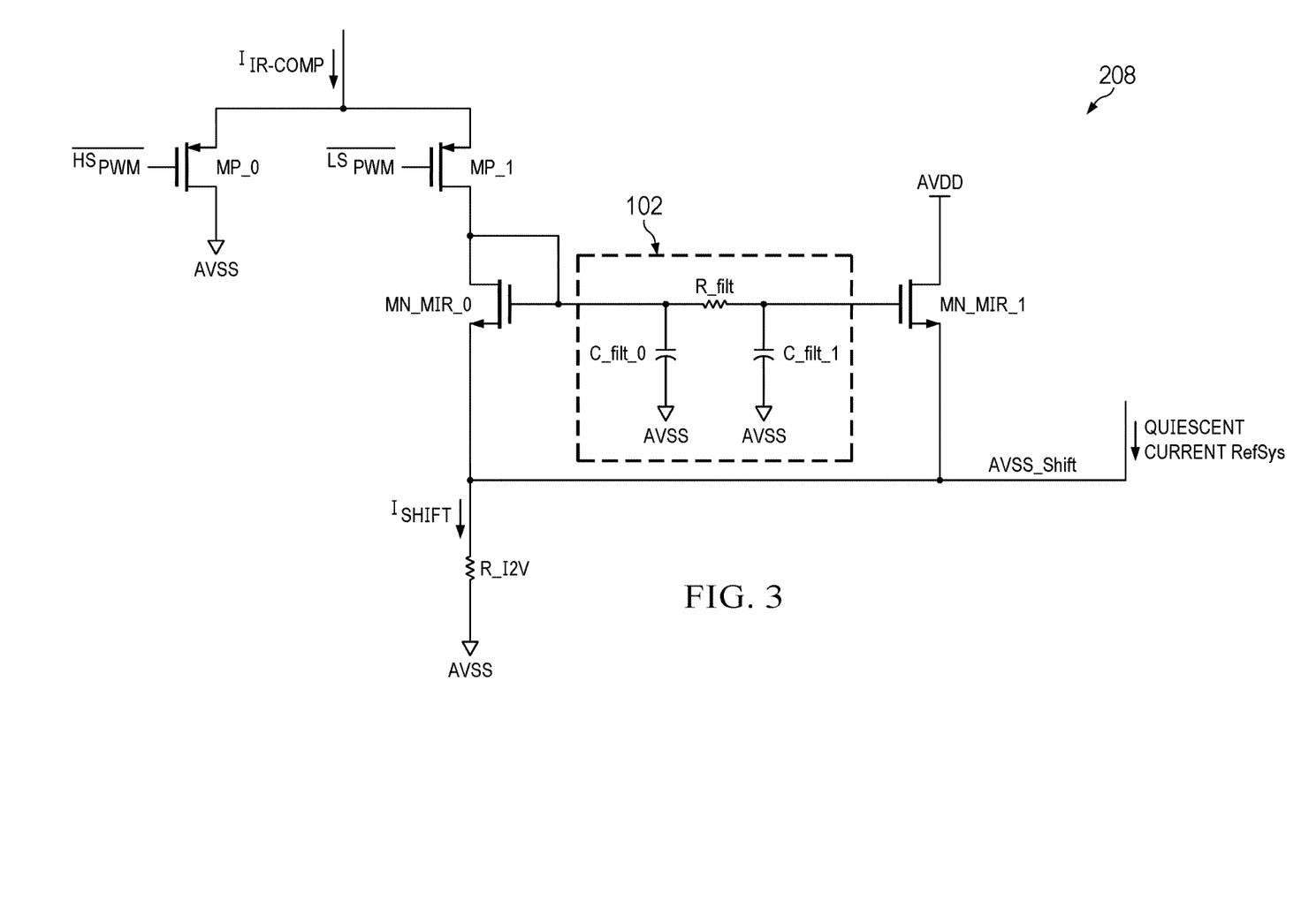
FIG. 3 is a schematic diagram of a ground reference circuit, in an example.

FIG. 3 illustrates an example of ground reference circuit 208. As mentioned above, ground reference circuit 208 may be integrated within controller 106. In some examples, ground reference circuit 208 may be part of a separate chip or module that is coupled with controller 106. In any case, ground reference circuit provides a dedicated ground reference terminal AVSS_Shift, which in this example case is based at least in part on the low-side PWM control signal LSPWM as well as the sample current $I_{IR\text{-}comp}$.

According to some embodiments, the sample current $I_{IR\text{-}comp}$ is received by transistors MP_0 and MP_1. According to some embodiments, MP_0 and MP_1 switch off and on in phase with the PWM controls HSPWM and LSPWM, respectively, such that only one transistor can be on at any given time. In some examples, both MP_0 and MP_1 are p-channel devices, such that they are respectively turned on by the inverse of HSPWM and LSPWM being asserted HIGH. In other examples, either or both MP_0 and MP_1 are n-channel devices that are turned on by HSPWM and LSPWM being asserted HIGH. In any case, MP_1 may be configured to be on whenever the low-side switching element HSD is on. Other examples may be configured differently, such as a power converter having only one switching element. In such an example case, a similar ground reference circuit 208 can be used, except there would be no second switching element and thus no MP_0.

During the periods of time when HSPWM is HIGH, MP_1 is off and the sample current $I_{IR\text{-}comp}$ flows through MP_0 to ground AVSS. However, during the periods of time when LSPWM is HIGH, MP_0 is off and the sample current $I_{IR\text{-}comp}$ flows through MP_1 and is received by a current mirror arrangement made up of transistors MN_MIR_0 and MN_MIR_1, according to some embodiments. Transistors MN_MIR_0 and MN_MIR_1 may each be n-channel devices. The current mirror arrangement may include a filter network 302 that can have any number of RC filter elements designed to filter out AC components so as to isolate the DC component of the sample current $I_{IR\text{-}comp}$. In one example, filter network 302 includes any number of capacitors (such as capacitors C_filt_0 and C_filt_1) coupled to ground AVSS and any number of resistors (such as resistor R_filt) coupled between the capacitors. Due to the inclusion of filter network 302, the current mirror can remain active to provide current to the AVSS_Shift terminal even during switching of MP_1, according to some embodiments. The current flowing through MN_MIR_0 may be roughly equal to $I_{IR\text{-}comp}*(1-D)$, where D is the duty cycle of the high-side switching element (HSD).

According to some embodiments, MN_MIR_1 is larger than MN_MIR_0 to impart a magnification factor on the current flowing through MN_MIR_1. For example, MN_MIR_1 may have a width-to-length ratio (W/L) that is at least 2 times, at least 4 times, at least 5 times, or at least 10 times larger than the width-to-length ratio (W/L) of MN_MIR_0. Accordingly, the current flowing through MN_MIR_1 may be roughly equal to $I_{IR-comp}*(1-D)*M$, where M is the magnification factor based on the size difference between MN_MIR_0 and MN_MIR_1.

According to some embodiments, the currents through MN_MIR_0 and MN_MIR_1 combine to form $I_{SHIFT}$ that flows through the resistor R_12V to create a DC voltage shift from the internal ground reference AVSS. $I_{SHIFT}$ is thus roughly equal to $I_{IR-comp}*(1-D)*(M+1)$. Any present parasitic (e.g., quiescent) currents are overpowered by the much larger $I_{SHIFT}$ and a stable voltage reference is created at the AVSS_Shift terminal. The reference voltage terminal AVSS_SHIFT may then be used by reference generator circuit 204 in order to create the reference voltage $V_{REF}$.

Further Examples

Example 1 is a ground reference circuit that includes a resistor having first and second resistor terminals, a first transistor having first and second terminals and a control terminal, a second transistor having first and second terminals and a control terminal, a third transistor having first and second terminals and a control terminal, and a fourth transistor having first and second terminals and a control terminal. The first resistor terminal is coupled to a reference terminal, and the second resistor terminal is coupled to a ground terminal. The second terminal of the first transistor is coupled to the ground terminal, and the control terminal of the first transistor is coupled to a first control signal terminal. The first terminal of the second transistor is coupled to the first terminal of the first transistor, and the control terminal of the second transistor is coupled to a second control signal terminal. The first terminal of the third transistor is coupled to both the control terminal of the third transistor and the second terminal of the second transistor, and the second terminal of the third transistor is coupled to the reference terminal. The first terminal of the fourth transistor is coupled to a power supply terminal, the second terminal of the fourth transistor is coupled to the reference terminal, and the control terminal of the fourth transistor is coupled to the control terminal of the third transistor.

Example 2 includes the ground reference circuit of Example 1, wherein the first control signal terminal is configured to receive a first pulse width modulation (PWM) control signal, and the second control signal terminal is configured to receive a second PWM control signal, wherein the first PWM control signal is the inverse of the second PWM control signal.

Example 3 includes the ground reference circuit of Example 1 or 2, wherein: the power supply terminal is a power converter circuit power supply terminal; the reference terminal is a voltage reference circuit ground terminal; and the ground terminal is a power converter circuit ground terminal.

Example 4 includes the ground reference circuit of any one of Examples 1-3, wherein both the first terminal of the first transistor and the first terminal of the second transistor are coupled to a sample current terminal.

Example 5 includes the ground reference circuit of any one of Examples 1-4, wherein the control terminal of the fourth transistor is coupled to the control terminal of the third transistor via one or more filters.

Example 6 includes the ground reference circuit of Example 5, wherein the resistor is a first resistor, and the one or more filters includes first and second capacitors and a second resistor, the first capacitor having a first terminal coupled to the control terminal of the third transistor and a second terminal coupled to the ground terminal, the second capacitor having a first terminal coupled to the control terminal of the fourth transistor and a second terminal coupled to the ground terminal, and the second resistor coupled between the first terminals of the first and second capacitors.

Example 7 includes the ground reference circuit of any one of Examples 1-6, wherein the first and second transistors are p-channel field effect transistors (FETs), and the third and fourth transistors are n-channel FETs.

Example 8 includes the ground reference circuit of any one of Examples 1-7, wherein the third transistor has a first width to length (W/L) ratio, and the fourth transistor has a second W/L ratio, the second W/L ratio being at least two times greater than the first W/L ratio.

Example 9 is an integrated circuit comprising the ground reference circuit of any one of Examples 1-8.

Example 10 includes the integrated circuit of Example 9, further comprising a voltage reference circuit having an output voltage terminal, and configured to generate a voltage reference across the output voltage terminal and the reference terminal.

Example 11 is a power converter controller that includes the ground reference circuit of any one of Examples 1-8, a voltage reference circuit having an output voltage terminal and a ground terminal coupled directly to the reference terminal, a pulse width modulation (PWM) circuit having a control input, first and second PWM outputs, and a sample current output. The first PWM output is coupled to the first control signal terminal, the second PWM output is coupled to the second control signal terminal, and the sample current output is coupled to the first terminals of the first and second transistors. The power converter controller also includes a comparator having first and second comparator inputs and a comparator output. The first comparator input is coupled to a feedback voltage terminal, the second comparator input is coupled to the output voltage terminal of the voltage reference circuit, and the comparator output is coupled to the control input of the PWM circuit. The feedback voltage terminal is configured to receive a feedback voltage representative of an output voltage of a power converter.

Example 12 is an integrated circuit that includes the power converter controller of Example 11.

Example 13 is a controller configured to control a switching element duty cycle for a power converter circuit. The controller includes a voltage reference circuit configured to generate a reference voltage and having a ground reference terminal and an output terminal, a pulse width modulation circuit configured to determine the switching element duty cycle based on a comparison between the reference voltage and a feedback voltage representative of an output voltage of the power converter circuit, and a ground reference circuit configured to generate a ground reference for the voltage reference circuit. The ground reference circuit includes a resistor coupled between the ground reference terminal of the voltage reference circuit and a ground terminal of the power converter circuit, a transistor having a first terminal, a second terminal, and a control terminal, with the control terminal configured to receive a pulse width modulation (PWM) control signal having the switching element duty cycle, and a current mirror circuit coupled between the second terminal of the transistor and the ground reference terminal of the voltage reference circuit.

Example 14 includes the controller of Example 13, wherein the controller is further configured to generate a sample current at a current terminal that is associated with an output current of the power converter circuit, and the first terminal of the transistor is coupled to the current terminal.

Example 15 includes the controller of Example 13 or 14, wherein the transistor is a first transistor, and the current mirror circuit comprises a second transistor and a third transistor, the second transistor coupled to the second terminal of the first transistor, and the third transistor having a control terminal coupled to a control terminal of the second transistor.

Example 16 includes the controller of Example 15, wherein a first terminal of the second transistor is coupled to both the second terminal of the first transistor and the control terminal of the second transistor, a second terminal of the second transistor is coupled to the ground reference terminal of the voltage reference circuit, such that the resistor is between the second terminal of the second transistor and the ground terminal of the power converter circuit, and a first terminal of the third transistor is coupled to a power rail terminal, and a second terminal of the third transistor is coupled to the ground reference terminal of the voltage reference circuit, such that the resistor is between the second terminal of the third transistor and the ground terminal of the power converter circuit.

Example 17 includes the controller of Example 15 or 16, further comprising one or more resistor-capacitor (RC) filters coupled between the control terminal of the second transistor and the control terminal of the third transistor.

Example 18 includes the controller of any one of Examples 15-17, wherein the second transistor has a first width-to-length (W/L) ratio, and the third transistor has a second W/L ratio, the second W/L ratio being at least two times greater than the first W/L ratio.

Example 19 is a power converter circuit that includes the controller of any one of Examples 13-18, a high-side switching element coupled between an input voltage terminal and a switching voltage terminal, a first driver having an output coupled to a control terminal of the high-side switching element, a low-side switching element coupled between the switching voltage terminal and the ground terminal of the power converter circuit, and a second driver having an output coupled to a control terminal of the low-side switching element.

Example 20 includes the power converter circuit of Example 19, wherein the PWM control signal is a first PWM control signal for setting a duty cycle for the low-side switching element and the controller is further configured to generate a second PWM control signal for setting a duty cycle for the high-side switching element.

Example 21 includes the power converter circuit of Example 20, wherein the second PWM control signal is the inverse of the first PWM control signal.

Example 22 includes the power converter circuit of Example 20 or 21, wherein the transistor is a first transistor, and the ground reference circuit further comprises a second transistor having first and second terminals and a control terminal, the control terminal of the second transistor configured to receive the second PWM control signal.

Example 23 includes the power converter circuit of Example 22, wherein the first terminal of the first transistor is coupled to the first terminal of the second transistor.

Example 24 is an integrated circuit that includes the controller of any one of Examples 13-18 or the power converter circuit of any one of Examples 19-23.

Example 25 is a voltage regulator that includes a first rail terminal, a second rail terminal, a ground rail terminal, a feedback circuit configured to provide a feedback voltage representative of an output voltage of the voltage regulator, a first transistor coupled between the first rail terminal and the ground rail terminal, a first driver coupled to a control terminal of the first transistor and configured to receive a voltage on the second voltage rail terminal, a second transistor coupled between the first transistor and the ground rail terminal, such that the first transistor and second transistor are serially connected between the first rail terminal and the ground rail terminal, a second driver coupled to a control terminal of the second transistor, a reference generator circuit having a ground terminal and configured to generate a reference voltage, a pulse width modulation circuit configured to determine a duty cycle of the second transistor based on a comparison between the feedback signal and the reference voltage, and a ground reference circuit configured to provide a ground reference to the ground terminal of the reference generator circuit.

Example 26 includes the voltage regulator of Example 25, wherein the ground reference circuit comprises a third transistor having a first terminal, a second terminal, and a control terminal with the control terminal of the third transistor being configured to receive a control signal associated with the duty cycle of the second transistor, a current mirror circuit coupled between the second terminal of the third transistor and the ground terminal of the reference generator circuit, and a resistor coupled between the ground terminal of the reference generator circuit and the ground rail terminal.

Example 27 includes the voltage regulator of Example 26, wherein the control signal is a first control signal and the ground reference circuit further comprises a fourth transistor having a first terminal, a second terminal, and a control terminal, with the second terminal of the fourth transistor coupled to the ground rail terminal. The control terminal of the fourth transistor is configured to receive a second control signal associated with a duty cycle of the first transistor.

Example 28 includes the voltage regulator of Example 27, wherein the first terminal of the third transistor is coupled to the first terminal of the fourth transistor.

Example 29 includes the voltage regulator of Example 27 or 28, wherein the pulse width modulation circuit is further configured to generate a sample current at a current terminal, the sample current associated with an output current of the voltage regulator, and wherein both the first terminal of the third transistor and the first terminal of the fourth transistor are coupled to the current terminal.

Example 30 includes the voltage regulator of any one of Examples 27-29, wherein the current mirror circuit comprises: a fifth transistor coupled to the second terminal of the third transistor; and a sixth transistor having a control terminal coupled to a control terminal of the fifth transistor via a filter network.

Example 31 includes the voltage regulator of Example 30, wherein a first terminal of the fifth transistor is coupled to the second terminal of the third transistor, a second terminal of the fifth transistor is coupled to the ground terminal of the reference generator circuit, a first terminal of the sixth transistor is coupled to a power voltage rail terminal, and a second terminal of the sixth transistor is coupled to the ground terminal of the reference generator circuit.

Example 32 includes the voltage regulator of Example 30 or 31, wherein the filter network includes one or more resistor-capacitor (RC) filters coupled between the control terminal of the fifth transistor and the control terminal of the sixth transistor.

Example 33 includes the voltage regulator of any one of Examples 30-32, wherein the fifth transistor has a first width-to-length (W/L) ratio and the sixth transistor has a second W/L ratio, the second W/L ratio being greater than the first W/L ratio.

Example 34 includes the voltage regulator of any one of Examples 25-33, wherein the first rail terminal is an input rail terminal, the second rail terminal is a bootstrapped rail terminal, the first transistor is a high-side transistor, and the second transistor is a low-side transistor.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin," and "lead" are used interchangeably. Unless specifically stated to the contrary, these terms are generally used to mean an interconnection between or a terminus of a device element, a circuit element, an integrated circuit, a device, or a semiconductor component. Furthermore, a voltage rail or more simply a "rail," may also be referred to as a voltage terminal and may generally mean a common node or set of coupled nodes in a circuit at the same potential.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end user and/or a third party.

While the use of particular transistors is described herein, other transistors (or equivalent devices) may be used instead. For example, a p-channel field effect transistor (PFET) may be used in place of an n-channel field effect transistor (NFET) with little or no changes to the circuit. Furthermore, other types of transistors may be used (such as bipolar junction transistors (BJTs)). Furthermore, the devices may be implemented in/over a silicon substrate (Si), a silicon carbide substrate (SiC), a gallium nitride substrate (GaN) or a gallium arsenide substrate (GaAs). Moreover, reference to transistor features such as gate, source, or drain is not intended to exclude any suitable transistor technologies. For instance, features such as source, drain, and gate are typically used to refer to a FET, while emitter, collector, and base are typically used to refer to a BJT. Such features may be used interchangeably herein. For instance, reference to the gate of a transistor may refer to either the gate of a FET or the base of a BJT, and vice-versa. In some examples, a control terminal may refer to either the gate of a FET or the base of a BJT. Any other suitable transistor technologies can be used. Any such transistors can be used as a switch, with the gate or base or other comparable feature acting as a switch select input that can be driven to connect the source and drain (or the emitter and collector, as the case may be).

References herein to a field effect transistor (FET) being "ON" (or a switch being closed) means that the conduction channel of the FET is present, and drain current may flow through the FET. References herein to a FET being "OFF" (or a switch being open) means that the conduction channel is not present, and drain current does not flow through the FET. A FET that is OFF, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter.

Modifications are possible in the described examples, and other examples are possible within the scope of the claims.

What is claimed is:

1. A ground reference circuit, comprising:
   a resistor having first and second resistor terminals, the first resistor terminal coupled to a reference terminal, and the second resistor terminal coupled to a ground terminal;
   a first transistor having first and second terminals and a control terminal, the second terminal of the first transistor coupled to the ground terminal, and the control terminal of the first transistor coupled to a first control signal terminal;
   a second transistor having first and second terminals and a control terminal, the first terminal of the second transistor coupled to the first terminal of the first transistor, and the control terminal of the second transistor coupled to a second control signal terminal;
   a third transistor having first and second terminals and a control terminal, the first terminal of the third transistor coupled to both the control terminal of the third transistor and the second terminal of the second transistor, and the second terminal of the third transistor coupled to the reference terminal; and
   a fourth transistor having first and second terminals and a control terminal, the first terminal of the fourth transistor coupled to a power supply terminal, the second terminal of the fourth transistor coupled to the reference terminal, and the control terminal of the fourth transistor coupled to the control terminal of the third transistor.

2. The ground reference circuit of claim 1, wherein the first control signal terminal is configured to receive a first pulse width modulation (PWM) control signal, and the second control signal terminal is configured to receive a second PWM control signal, wherein the first PWM control signal is an inverse of the second PWM control signal.

3. The ground reference circuit of claim 1, wherein both the first terminal of the first transistor and the first terminal of the second transistor are coupled to a sample current terminal.

4. The ground reference circuit of claim 1, wherein the control terminal of the fourth transistor is coupled to the control terminal of the third transistor via one or more filters.

5. The ground reference circuit of claim 1, wherein the third transistor has a first width to length (W/L) ratio, and the fourth transistor has a second W/L ratio, the second W/L ratio being at least two times greater than the first W/L ratio.

6. An integrated circuit comprising the ground reference circuit of claim 1.

7. The integrated circuit of claim 6, further comprising a voltage reference circuit having an output voltage terminal, and configured to generate a voltage reference across the output voltage terminal and the reference terminal.

8. A power converter controller comprising:
the ground reference circuit of claim 1;
a voltage reference circuit having a ground terminal coupled directly to the reference terminal, and an output voltage terminal;
a pulse width modulation (PWM) circuit having a control input, first and second PWM outputs, and a sample current output, the first PWM output coupled to the first control signal terminal, the second PWM output coupled to the second control signal terminal, and the sample current output coupled to the first terminals of the first and second transistors; and
a comparator having first and second comparator inputs and a comparator output, the first comparator input coupled to a feedback voltage terminal, the second comparator input coupled to the output voltage terminal of the voltage reference circuit, and the comparator output coupled to the control input of the PWM circuit, wherein the feedback voltage terminal is configured to receive a feedback voltage representative of an output voltage of a power converter.

9. A controller configured to control a switching element duty cycle for a power converter circuit, the controller comprising:
a voltage reference circuit configured to generate a reference voltage and having a ground reference terminal and an output terminal;
a pulse width modulation circuit configured to determine the switching element duty cycle based on a comparison between the reference voltage and a feedback voltage representative of an output voltage of the power converter circuit; and
a ground reference circuit configured to generate a ground reference for the voltage reference circuit, the ground reference circuit including
a resistor coupled between the ground reference terminal of the voltage reference circuit and a ground terminal of the power converter circuit,
a transistor having a first terminal, a second terminal, and a control terminal, the control terminal configured to receive a pulse width modulation (PWM) control signal having the switching element duty cycle, and
a current mirror circuit coupled between the second terminal of the transistor and the ground reference terminal of the voltage reference circuit.

10. The controller of claim 9, wherein the controller is further configured to generate a sample current at a current terminal that is associated with an output current of the power converter circuit, and the first terminal of the transistor is coupled to the current terminal.

11. The controller of claim 9, wherein the transistor is a first transistor, and the current mirror circuit comprises a second transistor and a third transistor, the second transistor coupled to the second terminal of the first transistor, and the third transistor having a control terminal coupled to a control terminal of the second transistor.

12. The controller of claim 11, wherein:
a first terminal of the second transistor is coupled to both the second terminal of the first transistor and the control terminal of the second transistor;
a second terminal of the second transistor is coupled to the ground reference terminal of the voltage reference circuit, such that the resistor is between the second terminal of the second transistor and the ground terminal of the power converter circuit; and
a first terminal of the third transistor is coupled to a power rail terminal, and a second terminal of the third transistor is coupled to the ground reference terminal of the voltage reference circuit, such that the resistor is between the second terminal of the third transistor and the ground terminal of the power converter circuit.

13. A power converter circuit, comprising:
the controller of claim 9;
a high-side switching element coupled between an input voltage terminal and a switching voltage terminal;
a first driver having an output coupled to a control terminal of the high-side switching element;
a low-side switching element coupled between the switching voltage terminal and the ground terminal of the power converter circuit; and
a second driver having an output coupled to a control terminal of the low-side switching element.

14. The power converter circuit of claim 13, wherein the PWM control signal is a first PWM control signal for setting a duty cycle for the low-side switching element and the controller is further configured to generate a second PWM control signal for setting a duty cycle for the high-side switching element.

15. The power converter circuit of claim 14, wherein the transistor is a first transistor, and the ground reference circuit further comprises a second transistor having first and second terminals and a control terminal, the control terminal of the second transistor configured to receive the second PWM control signal.

16. A voltage regulator, comprising:
a first rail terminal;
a second rail terminal;
a ground rail terminal;
a feedback circuit configured to provide a feedback voltage representative of an output voltage of the voltage regulator;
a first transistor coupled between the first rail terminal and the ground rail terminal;
a first driver coupled to a control terminal of the first transistor and coupled to the second rail terminal;

a second transistor coupled between the first transistor and the ground rail terminal, such that the first transistor and second transistor are serially connected between the first rail terminal and the ground rail terminal;

a second driver coupled to a control terminal of the second transistor;

a reference generator circuit having a ground terminal and configured to generate a reference voltage;

a pulse width modulation circuit configured to determine a duty cycle of the second transistor based on a comparison between the feedback signal and the reference voltage; and a ground reference circuit configured to provide a ground reference to the ground terminal of the reference generator circuit.

17. The voltage regulator of claim 16, wherein the ground reference circuit comprises:

a third transistor having a first terminal, a second terminal, and a control terminal, the control terminal of the third transistor configured to receive a control signal associated with the duty cycle of the second transistor;

a current mirror circuit coupled between the second terminal of the third transistor and the ground terminal of the reference generator circuit; and a resistor coupled between the ground terminal of the reference generator circuit and the ground rail terminal.

18. The voltage regulator of claim 17, wherein the control signal is a first control signal, the ground reference circuit further comprising a fourth transistor having a first terminal, a second terminal, and a control terminal, the second terminal of the fourth transistor coupled to the ground rail terminal, and the control terminal of the fourth transistor configured to receive a second control signal associated with a duty cycle of the first transistor.

19. The voltage regulator of claim 18, wherein the pulse width modulation circuit is further configured to generate a sample current at a current terminal, the sample current associated with an output current of the voltage regulator, and wherein both the first terminal of the third transistor and the first terminal of the fourth transistor are coupled to the current terminal.

20. The voltage regulator of claim 18, wherein the current mirror circuit comprises: a fifth transistor coupled to the second terminal of the third transistor, and a sixth transistor having a control terminal coupled to a control terminal of the fifth transistor via a filter network.

* * * * *